Sept. 14, 1965     I. ROSENAK     3,206,047
CONTAINER WITH EXPENDABLE CLOSURE
Filed Dec. 8, 1961
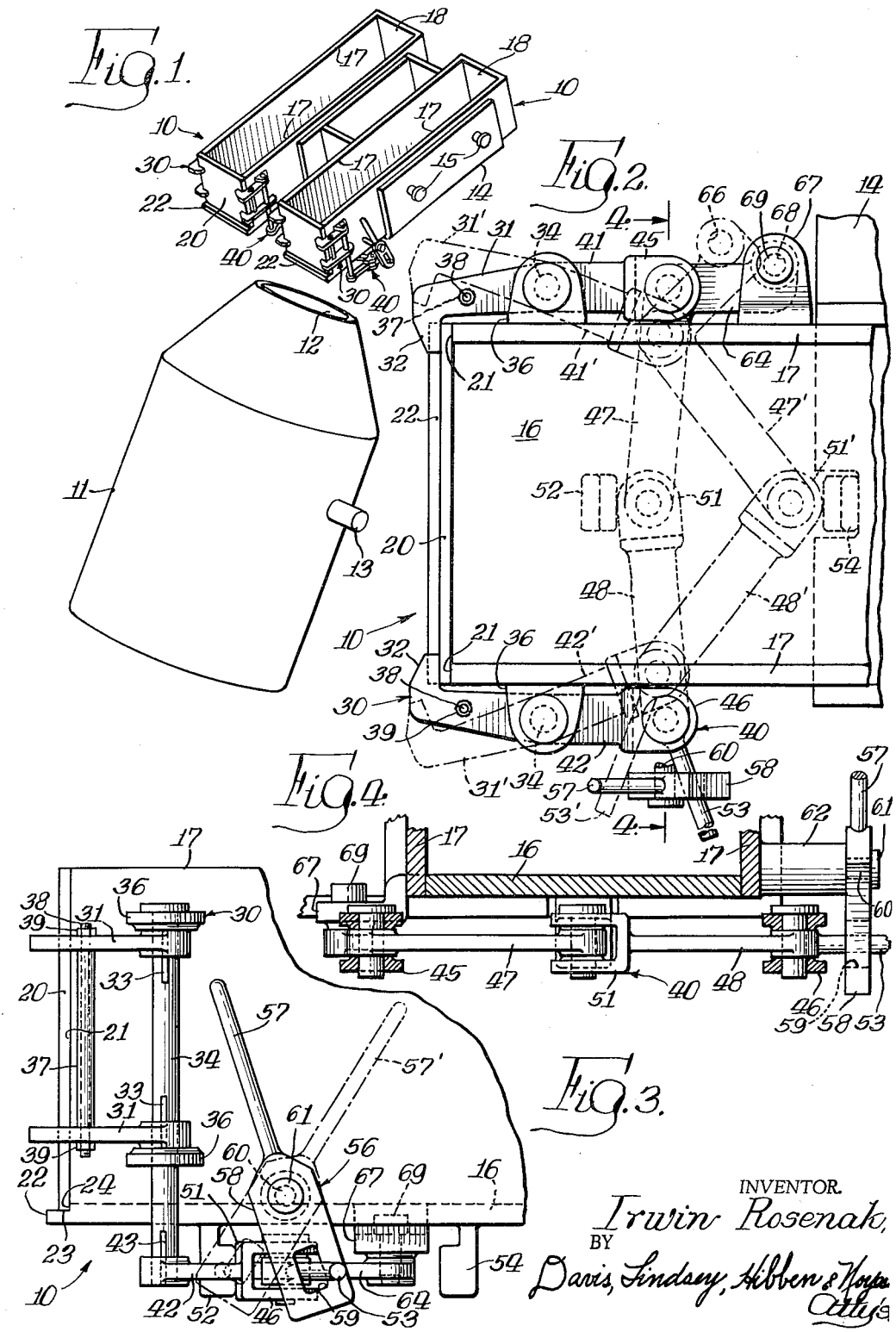
INVENTOR.
Irwin Rosenak,
BY
Davis, Lindsey, Hibben & Noyes
Attys

United States Patent Office 3,206,047
Patented Sept. 14, 1965

3,206,047
CONTAINER WITH EXPENDABLE CLOSURE
Irwin Rosenak, Hammond, Ind., assignor to Inland Steel Company, Chicago, Ill., a corporation of Delaware
Filed Dec. 8, 1961, Ser. No. 158,068
11 Claims. (Cl. 214—35)

This invention relates to novel containers, and more particularly to a container having an expendable closure for effecting rapid and positive emptying of the contents thereof during a metallurgical operation or the like.

In the production of steel and other metals, it frequently becomes necessary to charge a furnace or vessel with material, such as scrap, flux, ore, alloy additions, or the like. When such material is to be added, it is desirable that the charging operation be completed as rapidly as possible in order to avoid undue prolongation of the processing cycle. For example, in an oxygen steelmaking process the converter must be charged very rapidly in view of the short processing time involved.

Conventionally, the addition of scrap to a furnace is accomplished by means of a charge box having a hinged end closure or by a bucket having a drop-bottom, the container being elevated to a position above the mouth of the furnace and the hinged closure or drop-bottom thereafter being opened. When such a container is filled with scrap metal, or the like, and opened, complete and rapid emptying of the container is not always achieved due to the opening therein becoming partially or wholly obstructed, either by the material or by the closure. It then becomes necessary to dislodge the obstruction or to prepare another scrap charge, either of which operations delays production.

The present invention overcomes the foregoing problem in that a novel charging box construction is contemplated wherein the closure or door portion thereof is expendable so that the closure becomes a part of the charge when the box is tilted to empty it and effect a charging operation. Because the present invention contemplates complete disconnection of the closure from the container, there is little or no likelihood of the opening in the container becoming obstructed. Rapid emptying of the container is thus at all times assured.

Accordingly, it is a general object of the present invention to provide an improved container having an opening and a detachable closure wherein obstruction of the opening is prevented and rapid emptying of the contents thereof is assured.

A more particular object is to provide an improved container or box construction of the foregoing character that is particularly adapted to contain a batch of charge material and for rapidly supplying the same to a point of use.

A specific object is to provide a novel and improved scrap box construction for storing and rapidly charging a metallurgical furnace with scrap material or the like in which an expendable closure is provided for closing an opening in the box and in which the closure becomes a part of the scrap charge upon detachment thereof from the box.

Other objects and advantages of the invention will become apparent upon making reference to the detailed description which follows and accompanying sheet of drawings, in which:

FIG. 1 is a semi-diagrammatic perspective view of a metallurigcal furnace and showing a pair of scrap charging boxes embodying the features of the present invention operatively disposed above the mouth of the furnace prior to a charging operation;

FIG. 2 is a fragmentary plan view of one of the charging boxes illustrated in FIG. 1, and showing certain details of the release mechanism and detachable closure at the end of the box;

FIG. 3 is a fragmentary side elevational view of the structure illustrated in FIG. 2; and FIG. 4 is a sectional view along the line 4—4 of FIG. 2.

Briefly described, the present invention contemplates, in its broader aspects, an improved container or box construction for rapidly dispensing material contained in the box through an opening therein, the box employing a novel expendable closure or door construction for said opening which permits of such rapid emptying and which minimizes the possibility of partial or total retention of the contents in the box due to obstruction of the opening or engagement thereof with structure at the open end of the box. In its more specific aspects, the present invention contemplates a novel scrap charging box construction for use in supplying quantities of scrap metal or the like to a metallurgical furnace. The present invention is thus particularly suited to the scrap charging operations in the production of steel. However, the container construction herein disclosed can also be used to rapidly dispense materials other than scrap metal.

The present invention thus contemplates an elongated container or box construction having an opening at one end thereof and a detachable closure closing said opening. Releasable holding means is provided for wholly disconnecting the closure from the container upon release of the holding means so that the closure, as well as the contents of the container, may be dispensed to a point of use. It is further contemplated that the detachable closure be of the same, or a material similar to that contained in the box, such that the closure as well as the material in the box may be utilized, as for example, as a scrap charge for a metallurgical furnace. In order to assure rapid and positive emptying of the box, the holding means is adapted to provide an unobstructed opening in the container when the closure is released. Such holding means, in this instance, comprises two pairs of pivotally mounted arms, each pair being arranged one above the other on each side of the box, for holding the closure in a position closing the open end thereof. The holding means also includes manually controlled interconnecting linkage for effecting movement of the arms between their respective closure holding and releasing positions.

In FIG. 1, a pair of elongated containers or scrap charging boxes 10 embodying the features of the present invention are illustrated, the latter being shown in operable relation with a metallurgical furnace such as an oxygen steelmaking converter 11 having a mouth or opening 12 at its upper end and a pair of trunnions 13 for tiltably mounting the converter on a cooperating support (not shown). In the present instance, the boxes 10 are arranged in laterally spaced side-by-side relation and are carried by a frame 14 having lugs 15 adapted to be engaged by a lifting crane or derrick (not shown). The frame 14 may thus be elevated to a position above the mouth 12 and thereafter tilted so as to dispense the contents of the containers by gravity into the furnace. Because the furnace 11 and frame 14 form no part of the present invention, further description thereof will not be included.

As will be apparent from FIGS. 2 and 3 in conjunction with FIG. 1, each box 10, in this instance, comprises an elongated rectangular shaped container having a bottom wall 16, upstanding side walls 17 and a rear end wall 18. The side walls 17 and end wall 18 are secured together at their edges to provide an open-topped box having an open front end.

According to the present invention, each box is provided with a detachable closure plate or front end wall 20 which is adapted to engage the bottom wall 16 and the front end edges, indicated at 21, of the side walls 17. To facilitate mounting of the closure 20, the bottom wall 16 includes a forwardly projecting ledge or step 22 for supporting the lower edge, indicated at 23, of the closure 20. The upper surface of the ledge 22 is somewhat below that of the bottom wall 16 to define a shoulder 24 (FIG. 3) which is flush with the front end edges 21 of the side walls 17. Because the ledge 22 is recessed, the lower edge 23 of the closure 20 may be slightly irregular and still not introduce any gaps along the line of contact between the upper surface of the bottom wall 16 and the closure 20. Smaller bits of material are thus contained in the box, which might otherwise escape.

In order to releasably hold the closure 20 engaged with the end edges 21, shoulder 24, and ledge 22, the invention includes a holding means in the form a releasable latch mechanism 30 and actuating linkage 40. The latch mechanism 30, in this instance, comprises a pair of longitudinally extending vertically spaced latch arms or clamp members 31 which are pivotally mounted on each side wall 17 adjacent the open end of the box. Each arm 31 has an inturned flange or jaw 32 (FIG. 2) at its forward end and is rigidly secured at its opposite end as by a tapered key 33, to a vertically extending shaft 34. Each shaft 34 is rotatably journalled in a pair of vertically spaced outwardly extending lugs 36 mounted on the side walls 17 adjacent the open end of the box. A tubular connecting member or spacer 37 is disposed between each pair of arms 31 to maintain the latter in their respective positions illustrated in FIGS. 2 and 3. An elongated stud bolt 38 extends through each tubular member 37 and pair of arms 31, and nuts 39 threaded onto the ends of the bolt 38 maintain the arms 31 engaged with the ends of the member 37. The lugs 36 may be provided with suitable bearing inserts (not shown) to permit free rotative movement of the shafts 34 and arms 31. The lower ends of the shafts 34 extend downwardly below the bottom wall 16 and are interconnected by the actuating linkage 40 so that the shafts 34 and the arms 31 at opposite sides of the box pivot toward and away from each other.

The actuating linkage 40 in this instance comprises a pair of stub links 41 and 42 rigidly secured, as by keys 43, to the lower ends of the shafts 34 with the links 41 and 42 extending rearwardly therefrom. The links 41 and 42 have bifurcated rear end portions 45 and 46, respectively, which are inter-connected by means of a pair of intermediate toggle links 47 and 48, the link 47 being pivotally connected to the end 45 and the link 48 being pivotally connected to the end 46. The adjacent inner ends of the toggle links 47 and 48 are also pivotally connected, as at 51. As will be apparent from FIG. 2, when the arms 31 are in their full line or holding position with respect to closure 20, the toggle links 47 and 48 extend substantially transversely of the box 10 below the bottom wall 16. In this condition the center pivot 51 of the toggle linkage 47–48 is in an over-center position and engages a stop 52 secured to the bottom wall 16 for limiting movement of the pivot 51 toward the front end of the box 10.

A control arm 53 is provided in order to effect rearward movement of the pivot 51 away from the stop 52 and consequent movement of the toggle links 47 and 48 toward their acutely inclined positions, as indicated at 47′ and 48′, corresponding to the outwardly diverging or release position of the arms, as indicated at 31′. The control arm 53, in the present instance, is rigid with the link 48 nad extends outwardly from the pivot 46 at a slight angle to the link 48. The control arm 53 could also extend outwardly from the pivot 45, depending upon the particular application. Movement of the control arm from its full line position, indicated at 53, to its dotted line position, indicated at 53′, is effective to shift the toggle link 48 and consequently the toggle link 47 and stub links 41 and 42 to their respective positions indicated at 48′, 47′, 41′ and 42′. The arms 31 are correspondingly swung outwardly from their full line positions holding the closure 20 against the edges 21 to their release positions 31′. Rearward movement of the pivot 51, and consequently the angle to which the arms 31 become inclined outwardly from the side walls 17, is limited by a second stop 54. The stop 54 is positioned so that when it is engaged by the pivot 51, as indicated at 51′, the jaws 32 are full retracted from the front end of the box 10 thereby releasing the closure plate 20 for discharging the contents of the box from its front end. As shown in FIG. 2 the fully released jaws 32 are beyond the side walls 17 so as to avoid any possible interference with rapid and complete dumping of the box.

Movement of the control arm 53 is achieved, in this instance, by manually operable means in the form of a pivotally mounted upright lever 56. The lever 56 includes a handle 57 and a yoke 58 having an elongated opening 59 in the lower end thereof through which the control arm 53 extends. The lever 56 may be pivotally mounted on either of the side walls 17, depending on the location of the control arm 53, as by means of a pin 60 having an enlarged head 61. The pin 60 in this instance is carried in a laterally outwardly extending post 62 secured to the side wall 17.

Thus, pivotal movement of the handle 57 from its full to its dotted line position, indicated at 57′ in FIG. 3, effects a corresponding movement of the lever 53. The arms 31 are thus swung outwardly to their positions indicated at 31′, thereby releasing the closure 20 and permitting the latter and the contents of the box 10 to be dispensed to a point of use.

In order to prevent accidental or unintentional release of the closure 20 and a consequent premature emptying of the contents of the box 10, means may be employed for temporarily locking the toggle linkage 40 in its closure holding position. Thus, the link 47 includes an angularly extending portion 64 having an opening 66 in its outer end, the portion 64 being adapted to extend rearwardly from the pivot 45 so that when the link 47 is in a closure holding position, the portion 64 will lie in a plane substantially parallel to the adjacent side wall 17. A laterally outwardly extending boss 67 having an opening 68 therethrough is secured to the side wall 17 rearwardly of the pivot 45 so that the opening 66 will be in registry with the opening 68 when the arms 31 are in their inwardly pivoted or closure holding position. A removable pin 69 having an enlarged head may thus be inserted through the openings 66 and 68 to lock the toggle linkage 40 in inoperative position. Accidental release of the closure 20 is thus prevented should an attempt be made to move the handle 57.

As previously mentioned, the closure 20 may be of the same type of material as is contained in the box 10 thereby permitting the closure, as well as the contents of the box 10, to be dispensed to a point of use. Where the device 10 is used as a scrap charging box for supplying scrap metal to a metallurgical furnace, such as the converter 11, the closure 20 is also of scrap material and thus becomes a part of the charge upon release thereof.

Thus, in the particular application of the charging boxes 10, illustrated in FIG. 1, the latter are arranged in the frame 14 in side-by-side relation so that the contents thereof can be rapidly dumped, one at a time, in rapid succession into the mouth 12 of the converter 11. Such dumping is achieved by aligning one of the boxes 10, and its detachable closure 20, with the opening 12 and thereafter tilting the frame 14 and releasing the closure 20. Immediately thereafter, the other box 10 may be rapidly moved into position over the opening 12, by shifting the crane, and emptied. The aforementioned lateral spacing of the boxes 10 thus facilitates alignment thereof with the converter opening 12, and because a pair of the boxes 10 are utilized, each can be of a convenient manageable length.

I claim:

1. A device for use in rapidly charging a metallurgical furnace, or the like, comprising an elongated tiltable container having a bottom wall, opposed side walls, an end wall, and an opening opposite said end wall, a wholly detachable closure engageable with said bottom wall and said side walls to provide a wholly detachable end wall at said opening, and means for releasably holding said closure in engaged relation with said bottom and side walls, whereby the entire contents of said container and said closure may be rapidly supplied to said furnace to charge the latter upon actuation of said releasable means and tilting of said container.

2. A device according to claim 1, further characterized in that said container is adapted to receive a supply of scrap metal, and said closure comprises a plate of said metal.

3. A device according to claim 2, further characterized in that the bottom wall of said container includes a ledge projecting outwardly of the end edges of said side walls, said ledge being disposed below the upper surface of said bottom wall to receive the lower edge of said closure, said ledge permitting installation of a closure having an irregularly shaped lower edge.

4. A device according to claim 1, further characterized in that said holding means comprises at least one pivotally mounted arm on each of the side walls of said container adjacent said opening, and means connected to said arms for swinging the latter between a position holding said closure engaged with said bottom and side walls and a position releasing said closure and remote from said opening.

5. A device according to claim 4, further characterized in that said holding means includes toggle linkage interconnecting said arms for effecting equal and opposite movement thereof, and manually operable means for shifting said linkage to effect movement of said arms.

6. A device according to claim 5, further characterized in that said linkage includes means for locking the latter in a position for maintaining said arms in a position holding said closure in a position closing said opening.

7. A device according to claim 5, further characterized in that a pair of stops are provided for limiting movement of said linkage and swinging movement of said arms, one of said stops being arranged so as to require over-center movement of said linkage during movement of said arms to said holding position, thereby to impose a biasing force on said arms holding said closure in position.

8. A charging box for a metallurgical furnace or the like comprising an elongated tiltable container having an open end portion through which the contents of the container are dumped by tilting the container, a wholly detachable and expendable end closure plate engageable with the open end portion of the container for temporarily closing the same, and releasable latch means mounted on said container and releasably engageable with said plate for clamping the latter in abutting relation against said open end portion, whereby upon release of said latch means the closure plate is completely detached from the container to be dumped simultaneously with the contents of the container in response to tilting of the latter.

9. A charging box for a metallurgical furnace or the like comprising an elongated open-topped tiltable container having an open end portion through which the contents of the container are dumped by tilting the container, a supporting ledge projecting forwardly from the bottom of said open end portion, a wholly detachable and expendable end closure plate loosely seated on said ledge for temporarily blocking said open end portion, and releasable latch means mounted on said container and releasably engaging said plate above said ledge for clamping the plate in abutting relation against the open end portion of said container, whereby upon release of said latch means the closure plate is completely detached from the container to be dumped simultaneously with the contents of the container in response to tilting of the latter.

10. The structure of claim 9 further characterized in that said releasable latch means comprises a plurality of latch members pivotally mounted on said container, and manually operable toggle linkage means cooperating with said latch members for opening and closing the latter.

11. The structure of claim 9 further characterized in that said container has a bottom wall and opposed side walls and said latch means comprises a plurality of latch members pivotally mounted on said side walls and movable to clear said open end portion during release of said latch means, and manually operable toggle linkage means extending beneath said bottom wall and operatively interconnecting the latch members on said side walls.

References Cited by the Examiner

UNITED STATES PATENTS

| | | | |
|---|---|---|---|
| 544,265 | 8/95 | Rogers | 298—23 |
| 779,804 | 1/05 | Rodenhausen | 298—8 |
| 1,350,713 | 8/20 | Ferdon. | |
| 1,764,615 | 6/30 | Edwards | 296—50 |
| 2,211,195 | 8/40 | Biszantz | 298—23 |
| 2,833,586 | 5/58 | McFeaters | 214—35 X |
| 3,003,650 | 10/61 | Longnecker | 214—35 |
| 3,120,248 | 2/64 | Gregory. | |

FOREIGN PATENTS 76,226  7/53  Denmark.

HUGO O. SCHULZ, *Primary Examiner.*